US011435054B2

(12) United States Patent
Han et al.

(10) Patent No.: US 11,435,054 B2
(45) Date of Patent: Sep. 6, 2022

(54) LIGHT SOURCE MODULE AND VEHICLE LAMP INCLUDING THE SAME

(71) Applicant: HYUNDAI MOBIS CO., LTD., Seoul (KR)

(72) Inventors: Gil Won Han, Yongin-si (KR); Hyun Woo Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/398,467

(22) Filed: Aug. 10, 2021

(65) Prior Publication Data

US 2022/0065424 A1 Mar. 3, 2022

(30) Foreign Application Priority Data

Aug. 25, 2020 (KR) ........................ 10-2020-0107233

(51) Int. Cl.

| | |
|---|---|
| ***F21S 45/47*** | (2018.01) |
| ***F21S 41/148*** | (2018.01) |
| ***F21V 23/06*** | (2006.01) |
| *B60Q 1/00* | (2006.01) |

(52) U.S. Cl.
CPC ............. *F21S 45/47* (2018.01); *F21S 41/148* (2018.01); *F21V 23/06* (2013.01)

(58) Field of Classification Search
CPC ......... F21S 45/47; F21S 43/195; F21V 23/06; F21V 17/10; H05K 2201/0311; H05K 3/326; H05K 1/0269; H05K 3/303; H01R 13/2435; H01R 13/245; H01R 13/2457; H01L 2223/54426
See application file for complete search history.

(56) References Cited

U.S. PATENT DOCUMENTS

2006/0141851 A1* 6/2006 Matsui .................... F21V 19/04 439/490

FOREIGN PATENT DOCUMENTS

| | | | | |
|---|---|---|---|---|
| CN | 102667318 A * | 9/2012 | ............... | F21K 9/00 |
| CN | 102102838 B * | 7/2013 | ............ | F21S 41/143 |
| DE | 102018101871 A1 * | 8/2019 | ............... | F21K 9/20 |
| EP | 3396239 A1 * | 10/2018 | ............... | B60Q 1/04 |

* cited by examiner

*Primary Examiner* — Omar Rojas Cadima
(74) *Attorney, Agent, or Firm* — NovoTechIP International PLLC

(57) ABSTRACT

The present disclosure relates to a light source module including: a heat dissipation member; a board disposed on the heat dissipation member; a light-emitting element disposed on the heat dissipation member and configured to transfer heat to the heat dissipation member; and a connection member disposed on the board and configured to electrically connect the light-emitting element and the board, thereby improving stability and reliability.

15 Claims, 6 Drawing Sheets

LIGHT SOURCE MODULE AND VEHICLE LAMP INCLUDING THE SAME

CROSS-REFERENCE TO RELATED APPLICATIONS

This application claims priority to and the benefit of Korean Patent Application No. 10-2020-0107233 filed in the Korean Intellectual Property Office on Aug. 25, 2020, the entire contents of which are incorporated herein by reference.

BACKGROUND OF THE INVENTION

1. Field of the Invention

The present disclosure relates to a light source module and a vehicle lamp including the same, and more particularly, to a light source module with improved stability and reliability, and a vehicle lamp including the same.

2. Discussion of Related Art

In general, a vehicle is provided with various types of lamps having a lighting function and a signal function. The lighting function allows a driver to easily recognize objects positioned around the vehicle during the nighttime driving. The signal function informs drivers in other vehicles and pedestrians on the road of a traveling state of the host vehicle.

For example, the vehicle is provided with headlamps (or headlights) and fog lamps mainly used for the lighting function, and turn signal lamps, tail lamps, brake lamps, and side markers used for the signal function. The installation criteria and specifications of a vehicle monitoring apparatus are stipulated in the regulations to enable the vehicle monitoring apparatus to sufficiently exhibit the functions thereof.

As one of the vehicle monitoring apparatuses, the headlamp provides a low-beam pattern or a high-beam pattern to ensure a front visual field of the driver during the nighttime driving. The headlamp plays a significantly important role in safe driving.

Meanwhile, a light source (e.g., an LED) of the headlamp generates high-temperature heat when emitting light, and luminous efficiency and lifespan of the light source may deteriorate when a temperature of the headlamp (e.g., a temperature of the light source) is raised. to a certain degree or more. Therefore, the temperature of the headlamp needs to be maintained under an appropriate temperature condition.

In the related art, there has been proposed a method of dissipating heat, which is generated from the light source, to the outside by using a heat dissipation member (e.g., a heat sink) mounted on a board on which the light source (LED) is mounted and by transferring the heat, which is generated from the light source, to the heat dissipation member via the board.

In the related art, however, the heat generated from the light source needs to be dissipated through a complicated heat transfer route including the board and the heat dissipation member through which the heat is sequentially transferred. As a result, there is a problem in that heat dissipation efficiency deteriorates and the heat generated from the light source is difficult to effectively dissipate.

Moreover, in the related art, an expensive board (e.g., a metal core PCB) made of a metallic material needs to be used to transfer the heat, which is transferred from the light source to the board, to the heat dissipation member, which causes a problem of increase in costs.

Therefore, recently, various studies have been conducted to ensure the heat dissipation property of the light source and reduce the costs, but the study results are still insufficient. Accordingly, there is a need to develop a technology to ensure the heat dissipation property of the light source and reduce the costs.

BRIEF SUMMARY OF THE INVENTION

The present disclosure has been made in an effort to provide a light source module with improved stability and reliability, and a vehicle lamp including the same.

The present disclosure has also been made in an effort to minimize a heat transfer route of a light-emitting element and improve heat dissipation performance of the light-emitting element.

The present disclosure has also been made in an effort to improve operational stability and reliability of a light-emitting element and extend a lifespan of the light-emitting element.

The present disclosure has also been made in an effort to minimize assembly tolerance of a light-emitting element and stably maintain an electrically connected state.

The present disclosure has also been made in an effort to simplify a structure and a manufacturing process, reduce costs, and improve spatial utilization and a degree of design freedom.

The objects to be achieved by the embodiments are not limited to the above-mentioned objects, but also include objects or effects that may be understood from the solutions or embodiments described below.

An embodiment of the present disclosure provides a light source module including: a heat dissipation member; a board disposed on the heat dissipation member; a light-emitting element disposed on the heat dissipation member, wherein the heat dissipation member is configured to dissipate heat transferred from the light-emitting element; and a connection member disposed on the board and configured to electrically connect the light-emitting element and the board.

This is to minimize a heat transfer route of the light-emitting element and improve heat dissipation performance of the light-emitting element.

That is, in the related art, the heat generated from the light source needs to be dissipated through a complicated heat transfer route including the board and the heat dissipation member through which the heat is sequentially transferred. As a result, there is a problem in that heat dissipation efficiency deteriorates and the heat generated from the light source is difficult to effectively dissipate.

Moreover, in the related art, an expensive board (e.g., a metal core PCB) made of a metallic material needs to be used to transfer the heat, which is transferred from the light source to the board, to the heat dissipation member, which causes a problem of increase in costs.

In contrast, according to the embodiment of the present disclosure, the light-emitting element may be mounted directly on the heat dissipation member, and the heat generated from the light-emitting element may be dissipated immediately through the heat dissipation member. Therefore, it is possible to obtain an advantageous effect of minimizing the heat transfer route of the light-emitting element and improving the heat dissipation performance of the light-emitting element.

Among other things, according to the embodiment of the present disclosure, since the board need not be disposed between the light-emitting element and the heat dissipation member, thermal resistance may be significantly decreased on the heat transfer route from the light-emitting element to the heat dissipation member (thermal resistance caused by the board may be eliminated). Therefore, it is possible to obtain an advantageous effect of further improving a heat dissipation effect of the light-emitting element.

Moreover, according to the embodiment of the present disclosure, the heat generated from the light-emitting element need not pass through the board. Therefore, it is possible to obtain an advantageous effect of reducing costs 1_w_ manufacturing the board using a low-cost non-metallic material.

For reference, in the embodiment of the present disclosure, the configuration in which the light-emitting element is disposed on the heat dissipation member and configured to transfer heat to the heat dissipation member may mean that the heat generated from the light-emitting element is transferred (transmitted) directly to the heat dissipation member without passing through another medium.

According to the exemplary embodiment of the present disclosure, the light source module may include a reference part disposed on the heat dissipation member, and the light-emitting element may be disposed on the heat dissipation member based on the reference part.

This is to minimize a position error (assembly tolerance) of the light-emitting element with respect to the heat dissipation member and improve the heat dissipation performance implemented by the heat dissipation member.

That is, the light-emitting element needs to be accurately mounted at the reference position (at a predefined position so that a maximum heat dissipation effect may be obtained) to maximize the heat dissipation effect implemented by the heat dissipation member.

In the related art, however, because the light-emitting element is attached to the board and the board is assembled with the heat dissipation member, the position tolerance of the light-emitting element with respect to the heat dissipation member is determined based on a total sum of first assembly tolerance between the light-emitting element and the board and second assembly tolerance between the board and the heal dissipation member. As a result, the light-emitting element is difficult to accurately mount at the reference position.

In contrast, according to the present disclosure, the reference part may be disposed on the heat dissipation member, and the light-emitting element may be disposed based on the reference part. Therefore, it is possible to obtain an advantageous effect of minimizing the position error between the heat dissipation member and the light-emitting element and maximizing the heat dissipation property. Among other things, according to the present disclosure, since the assembly tolerance between the board and the heat dissipation member may be eliminated, it is possible to obtain an advantageous effect of more accurately mounting the light-emitting element at the reference position.

The reference part may have various structures capable of defining a reference position of the light-emitting element.

For example, the reference part may include: a first reference hole provided in the heat dissipation member; and a second reference hole provided in the heat dissipation member and spaced apart from the first reference hole, and the light-emitting element may be disposed between the first reference hole and the second reference hole.

The connection member may be variously changed in structure and shape in accordance with required conditions and design specifications.

In particular, the connection member may be in elastic contact with the light-emitting element.

This is to minimize disconnection (defective connection) of the connection member caused by interference and contact that may occur during a process of assembling other constituent components with the periphery of the light-emitting element in the vehicle lamp.

That is, a reflector may be assembled in a direction from above to below to cover a part of an upper portion of the board. If the connection member has an inelastic, rigid structure, there is a problem in that the disconnection of the connection member occurs when the reflector comes into contact with the connection member during the process of assembling the reflector.

In contrast, according to the embodiment of the present disclosure, the connection member may be in elastic contact with the light-emitting element. Therefore, it is possible to obtain an advantageous effect of stably maintaining the connected state implemented by the connection member (the connected state between the board and the light-emitting element) even though the interference and contact occur on the connection member.

The elastic structure of the connection member may be variously implemented in accordance with required conditions and design specifications.

For example, the connection member may include: a first connection part fixed to the board; and a second connection part connected to the first connection part so as to be elastically movable and being in elastic contact with the light-emitting element.

In particular, the second connection part may have an arc-shaped cross-section that allows the second connection part to elastically move relative to the first connection part.

According to the exemplary embodiment of the present disclosure, the light source module may include a connector terminal integrated with the board and configured to engage a connector supplying external power.

As described above, in the embodiment of the present disclosure, the connector terminal may be integrated with the board, such that a separate connector need not be mounted on the board. Therefore, it is possible to obtain an advantageous effect of simplifying the structure of the board, contributing to the size reduction of the board, and reducing costs of the board.

In particular, the board may include an accommodation portion configured to accommodate the connector connected to the connector terminal.

Since the board includes the accommodation portion as described above, it is possible to obtain an advantageous effect of reducing the size and weight of the board. In addition, because the amount of raw material required to manufacture the board may be reduced to the extent of the space of the accommodation portion, it is possible to obtain an advantageous effect of reducing costs.

Another embodiment of the present disclosure provides a vehicle lamp including: a heat dissipation member; a board disposed on the heat dissipation member; a light-emitting element disposed on the heat dissipation member and configured to transfer heat to the heal dissipation member; and a connection member disposed on the board and configured to electrically connect the light-emitting element and the board.

According to the exemplary embodiment of the present disclosure, the vehicle lamp may include a reference part disposed on the heat dissipation member, and the light-emitting element may be disposed on the heat dissipation member based on the reference part.

According to the exemplary embodiment of the present disclosure, the reference part may include: a first reference hole provided in the heat dissipation member; and a second reference hole provided in the heat dissipation member and spaced apart from the first reference hole, and the light-emitting element may be disposed between the first reference hole and the second reference hole.

According to the exemplary embodiment of the present disclosure, the connection member may be in elastic contact with the light-emitting element.

According to the exemplary embodiment of the present disclosure, the connection member may include: a first connection part fixed to the board; and a second connection part connected to the first connection part so as to be elastically movable and being in elastic contact with the light-emitting element. In particular, the second connection part may have an arc-shaped cross-section that allows the second connection part to elastically move relative to the first connection part.

According to the exemplary embodiment of the present disclosure, the vehicle lamp may include a connector terminal integrated with the board and configured to engage a connector supplying external power. In particular, the board may include an accommodation portion configured to accommodate the connector connected to the connector terminal.

DETAILED DESCRIPTION OF THE INVENTION

Figure 1:
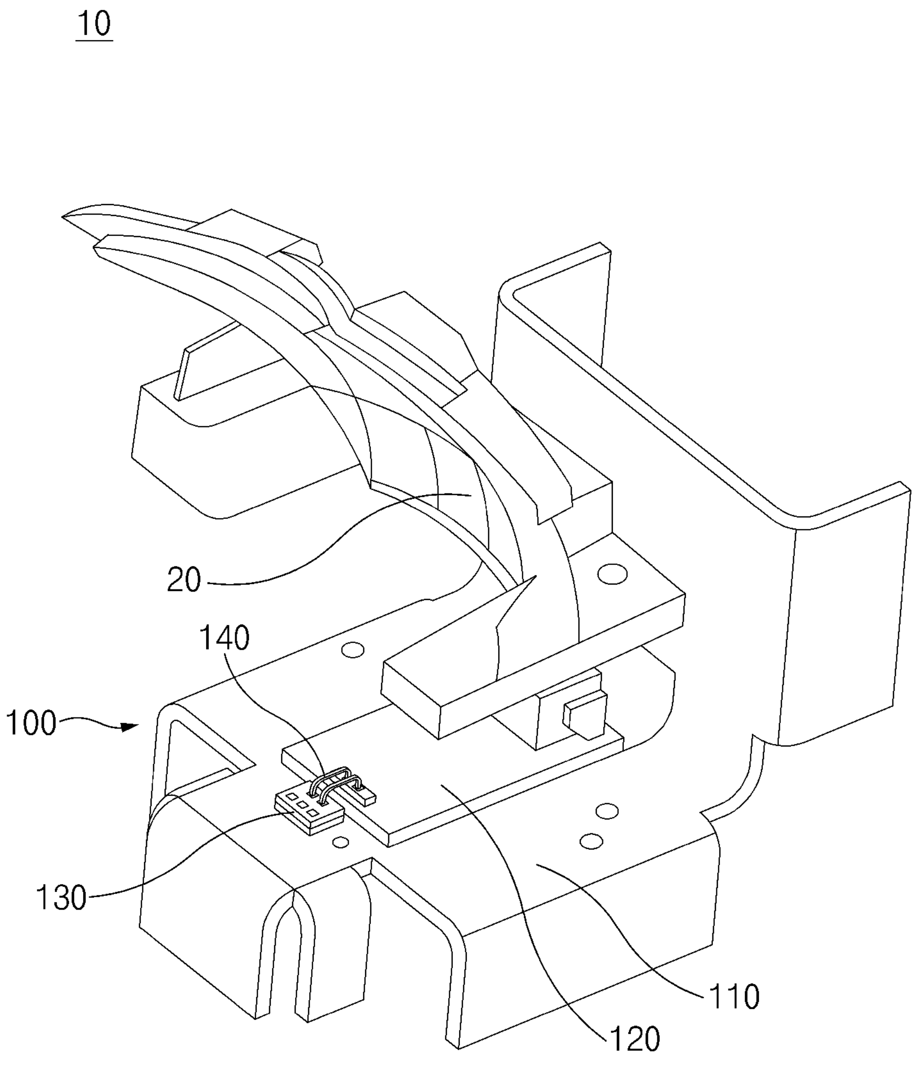
FIG. 1 is a view for explaining a vehicle lamp according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 6, a light source module 100 according to the embodiment of the present disclosure includes: a heat dissipation member 110; a board 120 disposed on the heat dissipation member 110; a light-emitting element 130 disposed on the heat dissipation member 110 and configured to transfer heat to the heat dissipation member 110, which in turn dissipates the heat transferred from the light-emitting element 130; and a connection member 140 disposed on the board 120 and configured to electrically connect the light-emitting element 130 and the board 120.

For reference, the light source module 100 according to the embodiment of the present disclosure may be mounted on various subjects in accordance with required conditions and design specifications. The present disclosure is not restricted or limited by the type and structure of the subject.

Hereinafter, an example will be described in which the light source module 100 according to the embodiment of the present disclosure is applied to a vehicle lamp 10.

For reference, the vehicle lamp 10 including the light source module 100 according to the embodiment of the present disclosure may be mainly used for a lighting function (e.g., headlamps or fog lamps) or for a signal function (e.g., turn signal lamps, tail lamps, brake lamps, or side markers), and the present disclosure is not restricted or limited by the use of the vehicle lamp 10.

For example, the vehicle lamp 10 according to the embodiment of the present disclosure may be used as a headlamp for a vehicle provided at each of front-left and front-right sides of the vehicle.

The vehicle lamp 10 may be variously changed in structure in accordance with required conditions and design specifications, and the present disclosure is not restricted or limited by the structure of the vehicle lamp 10.

For example, referring to FIG. 1, the vehicle lamp 10 may include the light source module 100, and a reflector 20 disposed in front of the light source module 100 and configured to reflect the light, emitted from the light source module 100, toward a location in front of the vehicle.

More specifically, the light source module 100 includes the heat dissipation member 110, the board 120, the light-emitting element, and the connection member 140.

The heat dissipation member 110 is configured to dissipate (radiate) the heat, which is generated from the light-emitting element, to the outside (e.g., into the air).

A typical heat dissipation component such as a heat plate (heat radiating plate) or a heat sink may be used as the heat dissipation member 110. The present disclosure is not restricted or limited by the type and property of the heat dissipation member 110.

Further, the heat dissipation member 110 may be variously changed in material and structure in accordance with required conditions and design specifications.

For example, the heat dissipation member 110 may be made of a metallic material capable of dissipating heat into the air. The heat dissipation member 110 may have an approximately "L"-shaped structure that may be disposed in a portion below the reflector 20.

The board 120 may be disposed on the heat dissipation member 110. Various types of components and elements required for the operation (light emission) of the light-emitting element 130 may be disposed on the board 120.

Figure 2:
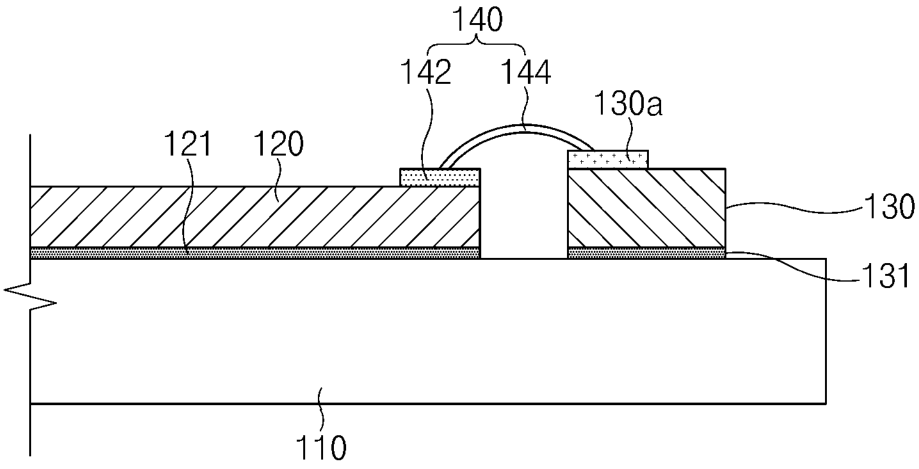
FIG. 2 is a cross-sectional view for explaining a light source module of the vehicle lamp according to the embodiment of the present disclosure.

For example, based on FIG. 2, the board 120 may be in close contact with one side of an upper surface of the heat dissipation member 110.

The board 120 may be integrally attached to the heat dissipation member 110 by means of a first bonding layer 121 or a bonding member. The present disclosure is not restricted or limited by the method of attaching or mounting the board 120.

In particular, the first bonding layer 121 may be made of a thermally conductive bonding agent. Since the first bonding layer 121 has thermal conductivity as described above, it is possible to obtain an advantageous effect of effectively transferring the heat, which is generated from the board 120, to the heat dissipation member 110.

The board 120 may have various structures capable of being disposed in the vehicle lamp 10, and the present disclosure is not restricted or limited by the shape and size of the board 120.

For example, the board 120 may have an approximately quadrangular plate shape. A part of an upper surface of the board 120 may be covered by the reflector 20.

An electrode pad, a resistor, and a heat detection element (e.g., an NTC thermistor) may be disposed (e.g., mounted) on the board 120. The present disclosure is not restricted or limited by the types and numbers of components and elements disposed on the board 120.

The light-emitting element 130 is disposed on the heat dissipation member 110 such that the heat generated by the light-emitting element 130 is transferred to and dissipated by the heat dissipation member 110.

In this case, the configuration in which the light-emitting element 130 is disposed on the heat dissipation member 110 and configured to transfer heat to the heat dissipation member 110 may mean that the heat generated from the light-emitting element 130 is transferred (transmitted) directly to the heat dissipation member 110 without passing through another medium.

For example, based on FIG. 2, the light-emitting element 130 may be in close contact with the other side of the upper surface of the heat dissipation member 110. According to another embodiment of the present disclosure, the light-emitting element may be disposed on a lateral surface, a bottom surface, or any other portions of the heat dissipation member.

Hereinafter, an example will be described in which the board 120 and the light-emitting element 130 are disposed on the upper surface of the heat dissipation member 110 and spaced apart from each other at a predetermined interval. According to another embodiment of the present disclosure, a lateral surface of the board and a. lateral surface of the light-emitting element may be in close contact with each other on the upper surface of the heat dissipation member.

The light-emitting element 130 may be integrally attached to the heat dissipation member 110 by means of a second bonding layer 131 or a bonding member. The present disclosure is not restricted or limited by the method of attaching or mounting the light-emitting element 130.

In particular, the second bonding layer 131 may be made of a thermally conductive bonding agent. Since the second bonding layer 131 has thermal conductivity as described above, it is possible to obtain an advantageous effect of effectively transferring the heat, which is generated from the light-emitting element 130, to the heat dissipation member 110.

The light-emitting element 130 may be variously changed in type and property in accordance with required conditions and design specifications.

For example, a light-emitting diode (LED), which is a semiconductor light-emitting element, may be used as the light-emitting element 130. In accordance with required conditions and design specifications, a plurality of light-emitting elements 130 may be used to emit light beams with the same color or different colors.

The reflector 20 may be configured to reflect the light, emitted from the light-emitting element 130, toward a location in front of the vehicle. The present disclosure is not restricted or limited by the shape and structure of the reflector 20.

For example, the reflector 20 may have an inner surface provided in the form of an elliptically curved surface or a free curved surface and having a reflective layer (reflective surface) so as to reflect the light, which is generated from the light-emitting element 130, toward a location in front of the vehicle lamp 10. The reflector 20 may have a. structure having a single focal point or multiple focal points. In particular, the light-emitting element 130 may be disposed on the focal point of the reflector 20 or in the vicinity of the focal point of the reflector.

For reference, in the embodiment of the present disclosure, the configuration in which the light-emitting element emits the light to a location in front of the vehicle may mean that the light-emitting element emits the light beam in a direction in which the vehicle travels. The direction indicated by the term 'front' may be changed depending on the installation position and installation direction of the vehicle lamp 10.

According to the exemplary embodiment of the present disclosure, an outer lens (not illustrated) may be disposed in front of the light-emitting element 130. The outer lens may protect the light-emitting element 130 and peripheral components from moisture, dust, external impact, and the like and define an external appearance.

According to another embodiment of the present disclosure, an inner lens (e.g., an aspherical lens, not illustrated) or other optical members (not illustrated) may be disposed between the light-emitting element 130 and the outer lens. The inner lens may transmit the light, reflected by the reflector 20 to the outside.

As described above, in the embodiment of the present disclosure, the light-emitting element 130 may be mounted directly on the heat dissipation member 110, and the heat generated from the light-emitting element 130 may be immediately dissipated through the heat dissipation member 110. Therefore, it is possible to obtain an advantageous effect of minimizing the heat transfer route of the light-emitting element 130 and improving the heat dissipation performance of the light-emitting element 130.

That is, in the related art, the heat generated from the light source needs to be dissipated through a complicated heat transfer route including the board and the heat dissipation member through which the heat is sequentially transferred. As a result, there is a problem in that heat dissipation efficiency deteriorates and the heat generated from the light source is difficult to effectively dissipate. Moreover, in the related art, an expensive board (e.g., a metal core PCB) made of a metallic material needs to be used to transfer the heat, which is transferred from the light source to the board, to the heat dissipation member, which causes a problem of increase in costs.

In contrast, in the embodiment of the present disclosure, the heat generated from the light-emitting element 130 may be transferred directly to the heat dissipation member 110. Therefore, it is possible to obtain an advantageous effect of more quickly and efficiently dissipating the heat generated from the light-emitting element 130.

Among other things, in the embodiment of the present disclosure, since the board 120 need not be disposed between the light-emitting element 130 and the heat dissipation member 110, thermal resistance may be significantly decreased on the heat transfer route from the light-emitting element 130 to the heat dissipation member 110 (thermal resistance caused by the board 120 may be eliminated). Therefore, it is possible to obtain an advantageous effect of further improving a heat dissipation effect of the light-emitting element 130.

Moreover, in the embodiment of the present disclosure, the heat generated from the light-emitting element 130 need not pass through the board 120. Therefore, it is possible to obtain an advantageous effect of reducing costs by manufacturing the board 120 using a low-cost non-metallic material.

Figure 4:
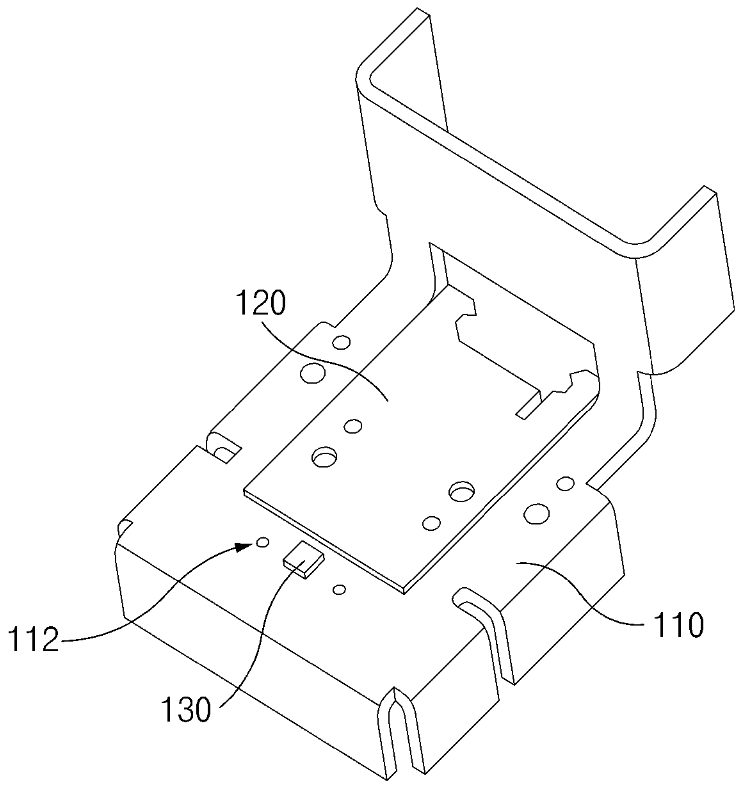
FIGS. 4 and 5 are views for explaining a reference part of the vehicle lamp according to the embodiment of the present disclosure.
Figure 5:
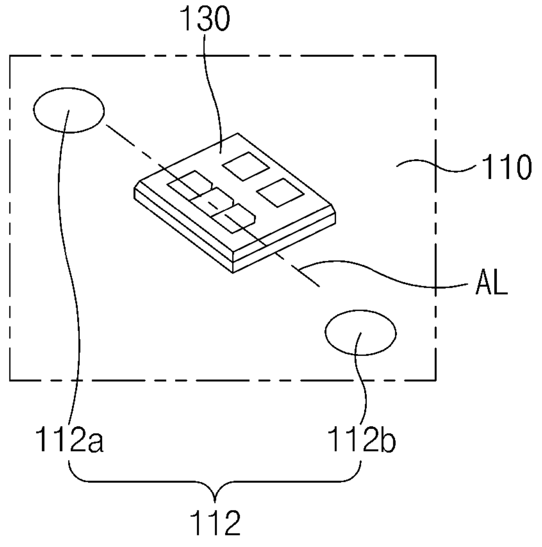

Referring to FIGS. 4 and 5, according to the exemplary embodiment of the present disclosure, the light source module 100 may include a reference part 112 disposed on the heat dissipation member 110. The light-emitting element 130 may be disposed on the heat dissipation member 110 based on the reference part 112.

This is to minimize a position error (assembly tolerance) of the light-emitting element 130 with respect to the heat dissipation member 110 and improve the heat dissipation performance implemented by the heat dissipation member 110.

That is, the light-emitting element 130 needs to be accurately mounted at the reference position (at a predefined position so that a maximum heat dissipation effect may be obtained) to maximize the heat dissipation effect implemented by the heat dissipation member 110.

In the related art, however, because the light-emitting element is attached to the board and the board is assembled with the heat dissipation member, the position tolerance of the light-emitting element with respect to the heat dissipation member is determined based on a total sum (first assembly tolerance+second assembly tolerance) of first assembly tolerance between the light-emitting element 130 and the board and second assembly tolerance between the board and the heat dissipation member. As a result, the light-emitting element is difficult to accurately mount at the reference position.

In contrast, according to the present disclosure, the reference part 112 may be disposed on the heat dissipation member 110, and the light-emitting element 130 may be disposed based on the reference part 112. Therefore, it is possible to obtain an advantageous effect of minimizing the position error between the heat dissipation member 110 and the light-emitting element 130 and maximizing the heat dissipation property of the light-emitting element 130.

Among other things, according to the present disclosure, since the assembly tolerance between the board 120 and the heat dissipation member 110 may be eliminated, it is possible to obtain an advantageous effect of more accurately mounting the light-emitting element 130 at the reference position.

The reference part 112 may have various structures capable of defining the reference position of the light-emitting element 130. The present disclosure is not restricted or limited by the structure of the reference part 112.

For example, the reference part 112 may include a first reference hole 112*a* provided in the heat dissipation member 110, and a second reference hole 112*b* provided in the heat dissipation member 110 and spaced apart from the first reference hole 112*a*. The light-emitting element 130 may be disposed (aligned) along an imaginary reference line AL defined between the first reference hole 112*a* and the second reference hole 112*b*.

According to another embodiment of the present disclosure, the reference part may include only one reference hole or three or more reference holes. Alternatively, instead of the reference hole, a reference protrusion (or a reference structure) may be provided, and the light-emitting element may be mounted based on the reference protrusion.

The connection member 140 may be disposed on the board 120 and electrically connect the light-emitting element 130 and the board 120. The connection member 140 may be variously changed in structure and shape in accordance with required conditions and design specifications.

In particular, the connection member 140 may be in elastic contact with the light-emitting element 130.

This is to minimize disconnection (defective connection) of the connection member 140 caused by interference and contact that may occur during a process of assembling other constituent components with the periphery of the light-emitting element 130 in the vehicle lamp 10.

For example, based on FIG. 1, the reflector 20 may be assembled in a direction from above to below to cover a part of an upper portion of the board 120. If the connection member 140 has an inelastic, rigid structure, there is a problem in that the disconnection of the connection member 140 occurs when the reflector 20 comes into contact with the connection member 140 during the process of assembling the reflector 20.

In contrast, according to the embodiment of the present disclosure, the connection member 140 may be in elastic contact with the light-emitting element 130. Therefore, it is possible to obtain an advantageous effect of stably maintaining the connected state implemented by the connection member 140 (the connected state between the board and the light-emitting element) even though the interference and contact occur on the connection member 140.

The elastic structure of the connection member 140 may be variously implemented in accordance with required conditions and design specifications.

Figure 3:
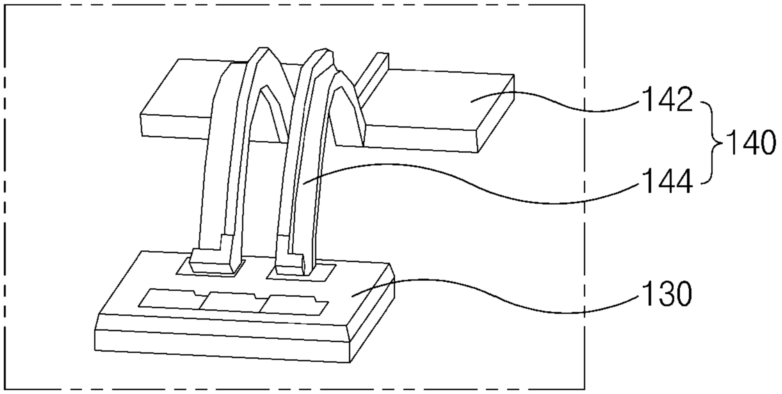
FIG. 3 is a view for explaining a connection member of the vehicle lamp according to the embodiment of the present disclosure.

For example, referring to FIG. 3, the connection member 140 may include a. first connection part 142 fixed to the board 120, and a second connection part 144 connected to the first connection part 142 so as to be elastically movable and being in elastic contact with the light-emitting element 130.

In particular, the second connection part 144 may have an arc-shaped cross-section that allows the second connection part 144 to elastically move relative to the first connection part 142. An end of the second connection part 144 may be in contact with an electrode 130*a* (see FIG. 2) of the light-emitting element 130.

According to another embodiment of the present disclosure, the second connection part may have another shape such as a circular shape, an elliptical shape, or an S-shape.

Figure 6:
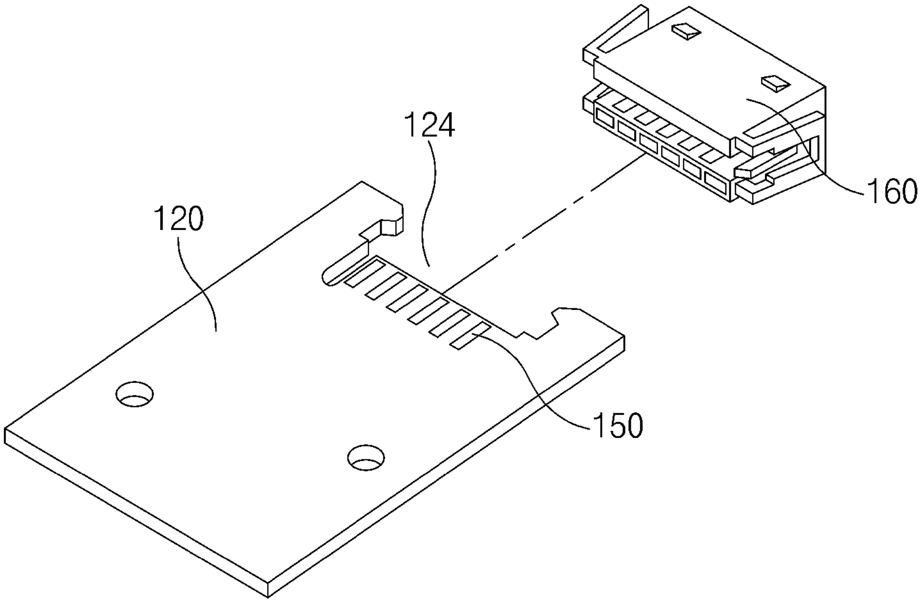
FIG. 6 is a view fir explaining a connector terminal of the vehicle lamp according to the embodiment of the present disclosure.

Referring to FIG. 6, according to the exemplary embodiment of the present disclosure, the light source module 100 may include a connector terminal 150 integrated. with the board 120. A connector 160 for applying external power may be connected to the connector terminal 150. The connector terminal 150 and the connector 160 may be configured to engage with each other.

For example, the connector terminal 150 may be manufactured together with the board 120 by dual injection molding.

As described above, in the embodiment of the present disclosure, the connector terminal 150 may be integrated with the board 120, such that a separate terminal connector (not illustrated) need not be mounted. on the board 120. Therefore, it is possible to obtain an advantageous effect of simplifying the structure of the board 120, contributing to the size reduction of the board 120, and reducing costs of the board 120.

In particular, the board 120 may include an accommodation portion 124 that accommodates the connector 160 connected to the connector terminal 150.

The accommodation portion 124 may be made by partially removing a part of the board 120. The connector 160 may be connected to the connector terminal 150 in the state in which the connector 160 is accommodated in the accommodation portion 124.

For example, the board 120 may be manufactured to have the accommodation portion 124. Alternatively, the board may be manufactured, and then the accommodation portion may be made by removing a part of the board.

Since the board 120 includes the accommodation portion 124 as described above, it is possible to obtain an advantageous effect of reducing the size and weight of the board 120. In addition, because the amount of raw material required to manufacture the board 120 may be reduced to the extent of the space of the accommodation portion 124, it is possible to obtain an advantageous effect of reducing costs.

According to the embodiment of the present disclosure as described above, it is possible to obtain an advantageous effect of improving stability and reliability.

In particular, according to the embodiment of the present disclosure, it is possible to obtain an advantageous effect of minimizing the heat transfer route of the light-emitting element and improving heat dissipation performance of the light-emitting element.

In addition, according to the embodiment of the present disclosure, it is possible to obtain an advantageous effect of improving operational stability and reliability of the light-emitting element and extending the lifespan of the light-emitting element.

In addition, according to the embodiment of the present disclosure, it is possible to obtain an advantageous effect of minimizing assembly tolerance of the light-emitting element and stably maintaining the electrically connected state.

In addition, according to the embodiment of the present disclosure, it is possible to obtain an advantageous effect of simplifying the structure and the manufacturing process, reducing the costs, and improving the spatial utilization and the degree of design freedom.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A light source module comprising:

a heat dissipation member having a main surface;

a board disposed on the main surface of the heat dissipation member;

a light-emitting element disposed on a first portion of the main surface of the heat dissipation member, wherein a location of the first portion on the main surface of the heat dissipation member is predetermined to maximize heat dissipation from the light-emitting element to the heat dissipation member;

a connection member extending between the light-emitting element and the board; and a reference structure disposed on a second portion of the main surface of the heat dissipation member and laterally spaced apart from the board and the light-emitting element, wherein a location of the second portion of the main surface is predetermined to indicate the location of the first portion of the main surface of the heat dissipation member, at which the heat dissipation from the light-emitting element to the heat dissipation member is maximized.

2. The light source module of claim 1, wherein:

the reference structure includes first and second reference elements laterally spaced apart from each other, and the light-emitting element is positioned on a straight line extending between the first and second reference elements.

3. The light source module of claim 1, wherein the connection member is in elastic contact with the light-emitting element.

4. The light source module of claim 3, wherein the connection member comprises:

a first connection part connected to the board; and a second connection part connected to the first connection part and being in elastic contact with the light-emitting element.

5. The light source module of claim 4, wherein the second connection part extends in an arc shape to allow the second connection part to elastically move relative to the first connection part.

6. The light source module of claim 1, further comprising a connector terminal integrated with the board and configured to engage a connector supplying external power.

7. The light source module of claim 6, wherein the board includes an accommodation portion configured to accommodate the connector.

8. A vehicle lamp comprising:

a heat dissipation member having a main surface;

a board disposed on a first portion of the main surface of the heat dissipation member;

a light-emitting element disposed on the main surface of the heat dissipation member, wherein; a location of the first portion on the main surface of the heat dissipation member is predetermined to maximize heat dissipation from the light-emitting element to the heat dissipation member;

a connection member extending between the light-emitting element and the board; and a reference structure disposed on a second portion of the main surface of the heat dissipation member and laterally spaced apart from the board and the light-emitting element, wherein a location of the second portion of the main surface is predetermined to indicate the location of the first portion of the main surface of the heat dissipation member, at which the heat dissipation from the light-emitting element to the heat dissipation member is maximized.

9. The vehicle lamp of claim 8, wherein the light-emitting element is configured to transfer heat directly to the heat dissipation member.

10. The vehicle lamp of claim 8, wherein:

the reference structure includes first and second reference elements laterally spaced apart from each other, and the light-emitting element is positioned on a straight line extending between the first and second reference elements.

11. The vehicle lamp of claim 8, wherein the connection member is in elastic contact with the light-emitting element.

12. The vehicle lamp of claim 11, wherein the connection member comprises:

a first connection part connected to the board; and a second connection part connected to the first connection part and being in elastic contact with the light-emitting element.

13. The vehicle lamp of claim 12, wherein the second connection part extends in an arc shape to allow the second connection part to elastically move relative to the first connection part.

14. The vehicle lamp of claim 8, further comprising a connector terminal integrated with the board and configured to engage a connector supplying external power.

15. The vehicle lamp of claim 14, wherein the board includes an accommodation portion configured to accommodate the connector.

* * * * *